United States Patent [19]
Welgas

[11] 3,853,161
[45] Dec. 10, 1974

[54] TRESTLE TEMPLATE FOR POWER TOOLS

[76] Inventor: John Welgas, 5819 N. 6th, Philadelphia, Pa. 19106

[22] Filed: May 15, 1973

[21] Appl. No.: 361,122

[52] U.S. Cl.................. 144/144.5, 33/197, 144/27, 144/144 R
[51] Int. Cl............................................. B27c 5/10
[58] Field of Search ...... 144/27, 144 R, 144 S, 133; 33/197

[56] References Cited
UNITED STATES PATENTS

| | | | |
|---|---|---|---|
| 2,894,333 | 7/1959 | Zern | 144/27 X |
| 3,407,853 | 10/1968 | Bailey | 144/27 X |
| 3,442,308 | 5/1969 | Steffens | 144/27 |
| 3,450,001 | 6/1969 | Fortune | 144/144 S X |

Primary Examiner—Andrew R. Juhasz
Assistant Examiner—W. D. Bray
Attorney, Agent, or Firm—Weiser, Stapler & Spivak

[57] ABSTRACT

A saw template for use in fabricating carpenters' trestles including a first, angularly inclined work holding surface and a second work holding surface disposed at right angles to the first surface, the first and second surfaces positioning a length of wood which serves as the trestle head in precise angular relationship to a cutting blade to permit the blade to take identical, repeated, angular cuts to receive the legs therein in exact angular relationship.

5 Claims, 8 Drawing Figures

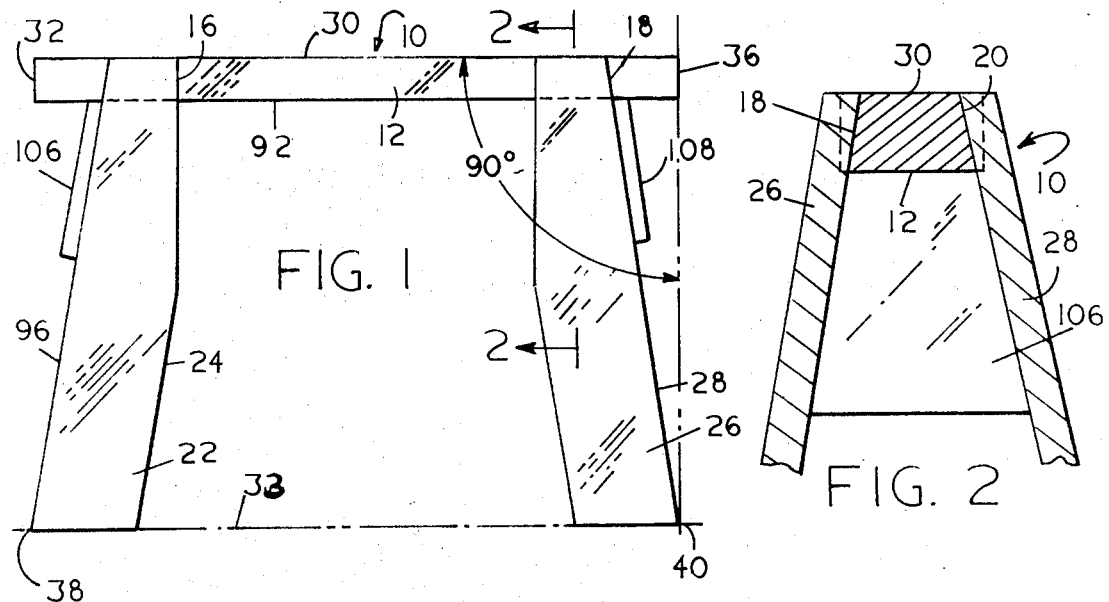
FIG. 1
FIG. 2
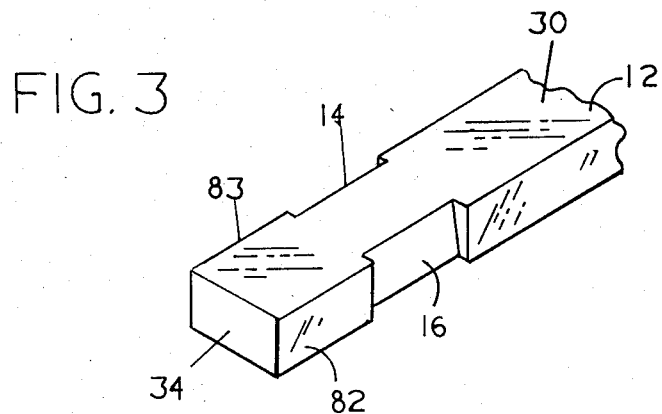
FIG. 3
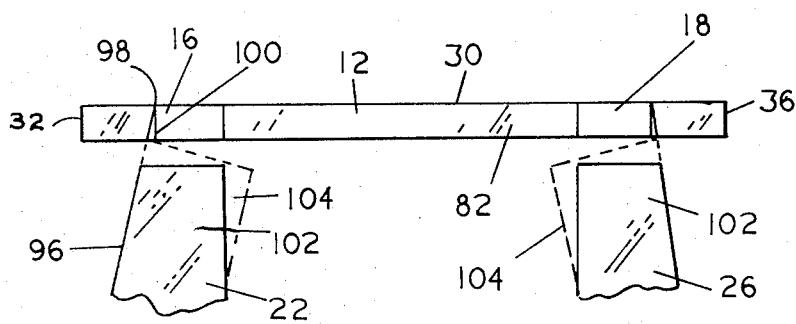
FIG. 4

TRESTLE TEMPLATE FOR POWER TOOLS

BACKGROUND OF THE INVENTION

The present invention relates generally to the art of carpentry tools and more particularly is directed to a novel saw template for cutting angularly inclined notches in one side of a length of wood.

On all construction jobs, it is the common practice for the carpenters to fabricate trestles (saw horses) for their own use in connection with the work. Most carpenters are quite exacting in the type of trestle they desire to use, and accordingly, take considerably time and effort to painstakingly lay out, notch and fabricate trestles in accordance with their own specifications. This practice, of course, results in many different designs and shapes and so, trestles fabricated by one carpenter are not the same as or interchangeable with trestles fabricated by another carpenter.

Most carpenters attempt to fabricate trestles having a floor to head height of approximately 26 inches to provide a working surface at a comfortable height. Other important considerations in addition to height enter into the fabrication of a properly designed trestle. It is the usual practice to position the legs to incline laterally from the point of connection to terminate in a vertical plane aligned with the end of the head. In this manner, extending members which may not be likely to trip workmen on the job can be fabricated. Additionally, the legs angularly incline transversely of the head in order to provide a sturdy, extremely stable working surface. The spread of the legs where they contact the floor is also of importance, as it is desirable to carpenters to carry their tools, including the trestles, between the studs of a building under construction. Said studs are normally positioned 16 inches on center. Therefore, the legs of the trestle should angularly incline outwardly from the head at an angular relationship designed to permit the bottom of the legs to readily fit within the studding to permit a carpenter to go about his duties with the least amount of interference.

It will be appreciated that trestles are usually fabricated on the job on an individual basis by skilled carpenters to meet their own requirements. Because of the time consumed in designing, laying out and actually fabricating prior art trestles, these activities have tended to become quite costly to the contractor in view of the relatively high wages now paid to skilled carpenters in the building construction industry

SUMMARY OF THE INVENTION

The present invention relates generally to the art of fabricating trestles and, more particularly, is directed to a saw template suitable for use with power tools normally found on the job site to quickly and accurately prepare trestles for use in the work.

The present invention includes a saw template which incorporates an angularly inclined first surface to receive one face of a rectangular length of wood and a second surface which angularly disposes from the first surface at an angle ninety degrees to contact a second face of the work piece. The first and second surfaces of the template cooperate to position the length of wood in precise angular relationship to a cutting tool such as a bench saw or a hand router. The cutting tool cooperates with the template to cut angularly inclined notches in the length of wood for receipt of a plurality of legs which angularly depend from the length of wood to form a stable, compact and sturdy working surface.

The templates as set forth in the present disclosure precisely angularly position a length of wood with respect to a cutting blade to enable identical notches to be cut in one face of the wood in a minimum time requirement. In this manner, a carpenter's trestle may be fabricated on the job site with minimum skilled labor requirements. Additionally, the templates of the present invention permit identical notches to be cut at all times so that duplicate trestles can be fabricated at any time when required. Accordingly, a trestle assembled at the beginning of a job will be identical with a trestle constructed toward the middle or end of the job, so that identical working tools can be provided for the carpenter at all times during the course of the job.

It is therefore an object of the present invention to provide an improved saw template of the type set forth.

It is another object of the present invention to provide a novel saw template including first and second working surfaces which angularly incline to angularly position a length of wood with respect to a cutting surface.

It is another object of the present invention to provide an improved saw template including a first angularly inclined working surface and a second working surface intersecting the first surface at ninety degrees to precisely position a length of wood for cutting purposes.

It is another object of the present invention to provide a novel saw template including a base for positioning a length of wood upon the table of a rotary table saw or radial arm saw and including first and second angularly inclined surfaces to precisely angularly position one face of the wood with respect to the cutting blade.

It is another object of the present invention to provide a novel saw template having inclined first and second surfaces adapted to angularly position a length of wood on the job site to cut precise, angular notches in the length of wood using a power hand tool, such as a router.

It is another object of this invention to provide a novel saw template that is inexpensive in manufacture, rugged in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a side elevational view of a carpenter's trestle fabricated by utilizing saw templates in accordance with the present invention.

FIG. 2 is a cross-sectional view taken along line 2—2 of FIG. 1, looking in the direction of the arrows.

FIG. 3 is a perspective view of one end of a trestle head prior to complete fabrication and after the notches have been cut by utilizing saw templates in accordance with the present invention.

FIG. 4 is a partial side elevational view showing the fabrication of the legs prior to trestle assembly.

DESCRIPTION OF THE PREFERRED EMBODIMENT OF THE INVENTION

Figure 5:
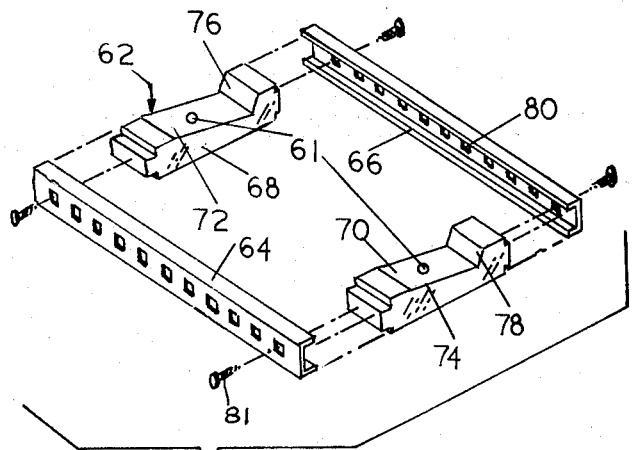
FIG. 5 is an exploded perspective view of a saw template in accordance with the present invention.

Although specific terms are used in the following description for the sake of clarity, these terms are intended to refer only to the particular structure of my invention selected for illustration in the drawings and are not intended to define or limit the scope of the invention Referring now to the drawings, I show in FIGS. 1 and 2 a carpenter's trestle 10, comprising an elongate head 12 which is generally fabricated of 2 by 3 or 2 by 4 lumber. The head is notched near each transverse end 34, 36 to provide a plurality of angularly inclined, leg receiving recesses 14,16,18, and 20. Each recess angularly inclines precisely one quarter inch per inch to receive the trestle legs 22,24,26,28 and to position the legs in identical angular relationship to the head 12. It is desirable to transversely angularly incline the respective pairs of legs 22, 24 and 26,28 outwardly for stability purposes. The widest distance between the legs 22,24 and 26,28 at the respective bottoms thereof is preferably restricted to a dimension suitable to fit within the usual 2 by 4 studs which are normally erected 16 inches on center when framing wall construction. An angular inclination of the respective recesses 14, 16 and 18, 20 toward the respective lateral ends 34,36 of the head 12, is provided both for the purposes of stability and to present a compact design. Preferably, the respective bottom lateral corners 38,40 of the trestle legs 22,24 and 26,28 align with respective vertical planes drawn through the lateral ends 34,36 of the trestle head 12.

Figure 6:
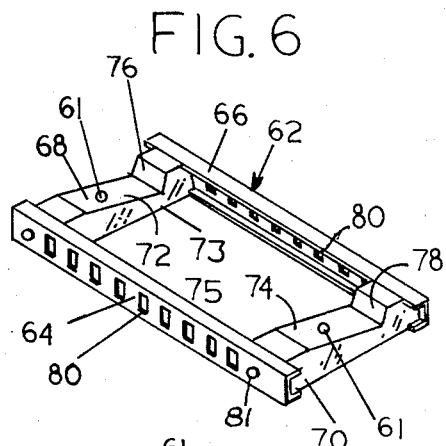
FIG. 6 is an assembled, perspective view of the saw template of FIG. 5.

Referring now to FIGS. 5 and 6, I show a saw template 62 comprising generally a pair of spaced power tool contacting base supports 64,66 which preferably are formed to a channel shaped cross-sectional configuration. A pair of cross braces 68,70 transversely connect to the respective ends of the base supports 64,66 and are machined or otherwise formed to provide a pair of angularly inclined first work holding surfaces 72, 74 which angularly depend from a plane drawn through the base supports 64,66 at precisely one-quarter inch per inch. The first inclined work holding surfaces 72,74 terminate transversely at one end thereof in the angularly inclined back plates 76,78. The back plates intersect at 90° with the inclined working holding surfaces 72,74 to provide the second work holding surfaces. The base supports 64,66 endwardly connect to the transverse ends of the respective cross braces 68,70 in well known manner such as by bolting or spot welding to form a sturdy, generally rectangular saw template. The members are preferably fabricated of steel to provide the necessary rigidity and strength for continuous field application without deformation or other damage. Each base support 64,66 is drilled or otherwise machined to provide a plurality of longitudinally spaced openings 80 which serve to secure the base supports 64, 66 to the respective cross pieces 68, 70 by utilizing the threaded fasteners 81.

Figure 7:
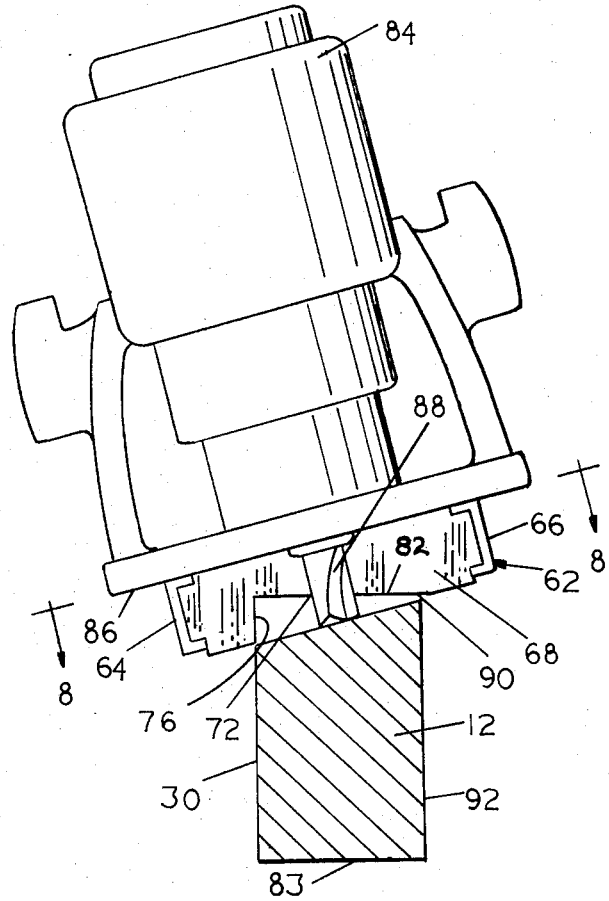
FIG. 7 is an enlarged, end elevational view showing the saw template of FIG. 6 in use in connection with a power router.
Figure 8:
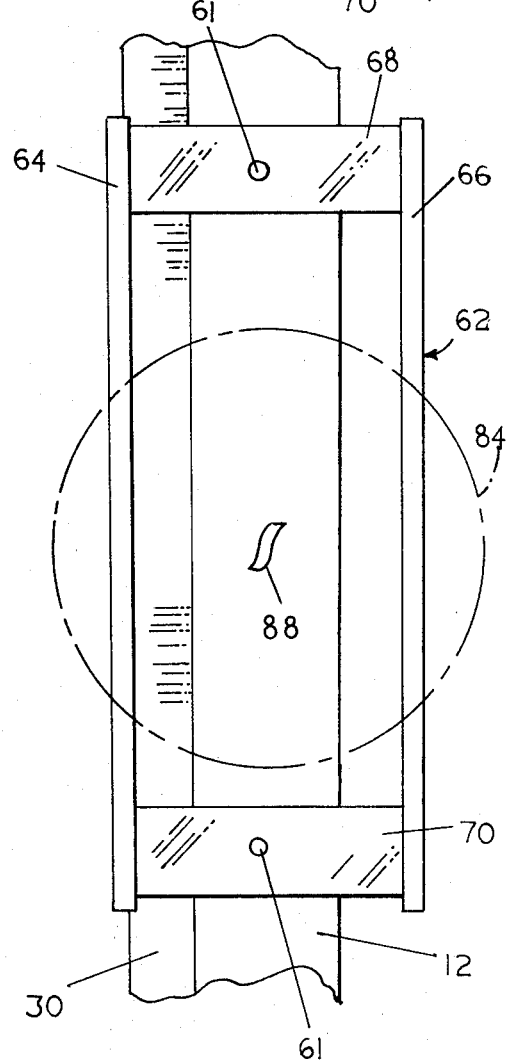
FIG. 8 is a cross-sectional view taken along line 8—8 of FIG. 7, looking in the direction of the arrows.

Referring now to FIGS. 7 and 8, the modified template 62 positions over one side 82 or 83 of the trestle head 12 in the desired location to precisely angularly cut a recess 14,16,18 or 20. One side 82 or 83 of the head 12 is applied to the first inclined work holding surfaces 72, 74 to angularly position the saw template 62 with respect to the axis of the trestle head 12. The template 62 is applied to the head 12 as best seen in FIG. 7 by positioning the first work holding surfaces 72, 74 against a side 82 or 83 and by positioning the second work holding surfaces 76, 78 against the top 30 of the head 12. In this manner, the spaced base supports 64, 66 are angularly inclined with respect to the top surface 30 to thereby provide an angularly inclined support for the router base table 86. A usual router 84 having a base table 86 is applied directly over the template 62 in a manner to rest the router table 86 directly upon the upper flanges of the channels of the spaced base supports 64,66. As seen in FIG. 7, the angular inclination of the first work holding surfaces 72, 74 when applied against the side 82 of the trestle head 12, angularly inclines the entire saw template 62 as it rests upon the base support 64, 66. The router 84 rests directly upon the template 62 and so also inclines to the same angular inclination. The router blade 88 is then activated in the usual manner to cut the respective recesses 14,16,18,20 by positioning the template 62 in the proper location on the head 12 to make the desired recess cuts. It will be observed that the blade 88 cuts parallel to the plane of the table 86 and similarly cuts the recess 14,16, 18 or 20 to the required depth in a cut that is also parallel with the base table 86. Thus, the first inclined work holding surfaces 72,74 and second work holding surfaces 76,78 position the router in angular relation to the head to precisely angularly cut the recesses to the desired angular inclination.

In order to use the template 62 to fabricate a carpenter's trestle, the head 12 should first be cut to the desired length, for instance 36 inches. Then measure 4 inches in from each end 34,36 and place a mark to indicate the outer position of the legs 22,24,26,28. Then measure off a second mark inwardly to suit the width of the leg to be used. For instance, if the legs are to be fabricated 1 inch by 6 inch lumber, the second mark should be placed 4 inches inwardly from the first mark. The template 62 is then placed over the first mark and the top 30 and a side 82 or 83 of the head are respectively firmly seated against the first work holding surfaces 72,74 and the back plates 76,78, which comprise the second work holding surfaces to angularly position the base supports 64,66 with respect to the vertical axis of the head. The template 62 may then he tacked in position using nails (not shown) applied through the openings 61 so that the template will not move during the recess cutting operation.

With the template 62 firmly affixed to the head 12 at the side 82 or 83 thereof, a router 84 is positioned with the base table 86 resting directly upon the upper flanges of the template base supports 64,66. The blade 88 is lowered to cut a recess 14,16,18, or 20 within the area defined within the base supports 64, 66 and the cross braces 68, 70. Each recess is cut to provide a notch 90 in the bottom surface 92 of the head 12 that is one-eighth inch below the side 82 or 83 of the head for positively securing the legs during the trestle assembly process. The blade 88 is activated to cut out the material inside of the template guide to form a perfectly inclined, properly positioned recess 14. The process is then repeated to properly prepare the remaining recesses 16, 18 and 20.

To complete a carpenter's trestle 10 after the respective recesses 14,16,18,20 have been cut in the head 12 by utilizing the saw templates 62, place the head 12 on a working surface (not shown) and mark off 26 inches downwardly at 90° from each end 34,36. Place a trestle leg 22,26 with its outer edge 96 aligned to position the bottom corner 38,40 at the said twenty-six inch mark and the leg top 102 overlying the top 98 of the outer limit of a recess 14 to define a small triangular area 100 on the side 82 of the head 12. This triangular area can then be removed using a saw and chisel in the usual manner to thereby shape the recess to allow the bottom corner 38,40 of the leg to align with a vertical plane drawn through the respective head ends 34,36. The top of the leg 102 should then be positioned to overlie the previously shaped recess 16 and marked to square out the leg with the head so that the top of the head will position 26 inches above the floor. The excess material 104 can then be removed from the top of the leg by employing a hand saw in the usual manner. Using this leg for a pattern, the remaining three legs can be readily cut prior to assembly.

With the leg tops properly shaped but not cut to length, the respective tops 102 insert upwardly into the associated recess 14,16,18,20. The bottoms of the legs can be tapped to wedge each leg securely to the head within its respective recess. Nails driven through the leg tops 102 directly into the head material behind the respective recesses serve to secure the legs in precise desired angular relationship with respect to the head 12. After all of the legs have been nailed tight to the head, 26 inches should be measured on the outside edge 96 in vertical alignment with the head end 34,36 and a mark placed thereon. A straight edge placed across the said marks on laterally positioned pairs of legs 22,26 and 24,28 defines the leg bottoms which are then cut to form a sturdy trestle that will stand solidly on the floor.

To complete the trestle 10, pieces of plywood about 6 inches wide and 3/8 inch or 1/2 inch in thickness can be utilized for the gussets 106, 108. The plywood pieces should be held tight against the legs 22,24 and 26,28 and the head to permit the angular relations to be readily marked for a pattern. The excess material can be cut off in the usual manner and the gussets nailed in place to form an extremely strong carpenter's trestle 10. In this manner, one pair of trestles or 10 trestles may be readily manufactured by hand with a minimum of effort and at a minimum time requirement. The trestles will always mate by following this technique. Should a trestle break during the course of a job, it is a simple matter to fabricate an exact duplicate. 1 year or 5 years later, by utilizing the templates 62 and the technique herein described, a duplicate trestle can always be produced.

I claim:

1. In a template for cutting angular recesses in a work piece having a plurality of sides and suitable for use with a power tool having a work contacting surface, the combination of
   A. a pair of spaced base supports,
      1. said supports defining a plane, the supports providing a support surface to receive the work contacting surface of the said power tool;
   B. at least one cross brace interconnected between the base supports,
      1. said cross brace having a first work holding surface which is angularly oriented relative to the plane,
      2. said first work holding surface resting upon a work piece side to position the plane of the base supports in angular relation to the said work piece side;
   B. said cross brace having a second work holding surface angularly intersecting the said first work holding surface,
      1. said second work holding surface intersecting said first work holding surface at an angle of 90°;
      2. the said second work holding surface contacting a second said side of the work piece.

2. The invention of claim 1 wherein a pair of cross braces are provided in spaced relationship, the said pair of base supports and pair of cross braces defining an interior area within which material is removed from the work piece.

3. The invention of claim 1 wherein the first work holding surface inclines from the said plane at an angle of precisely one-quarter inch per inch.

4. The invention of claim 1 wherein the cross brace includes means to secure the template to the work piece.

5. The invention of claim 4 wherein the means to secure comprise an opening through the cross brace to receive a fastener.

* * * * *